No. 802,241. PATENTED OCT. 17, 1905.
I. D. SCHENCK & F. V. THOMSON.
COMBINED RAKE AND STACKER.
APPLICATION FILED DEC. 30, 1904.
3 SHEETS—SHEET 2.
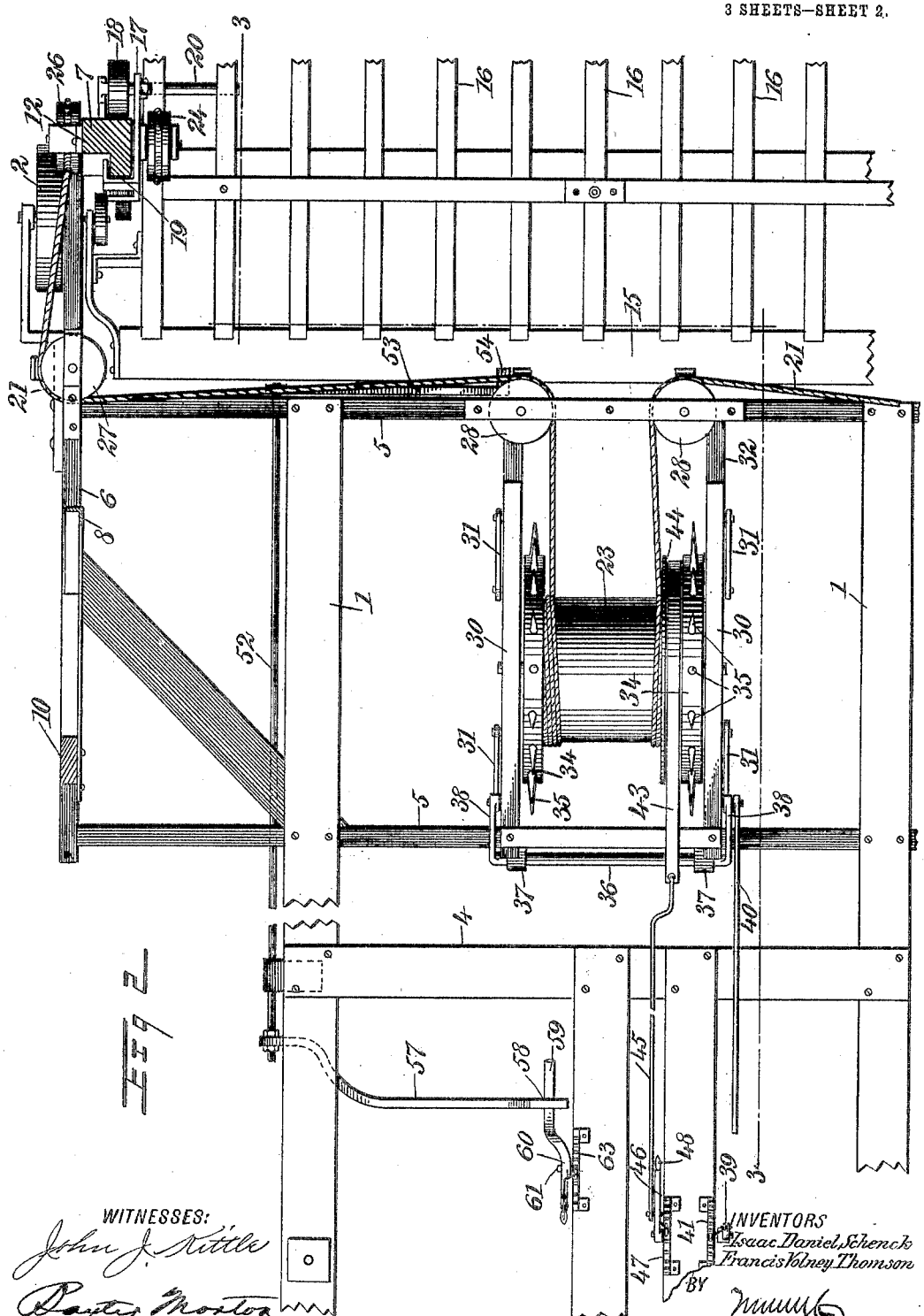

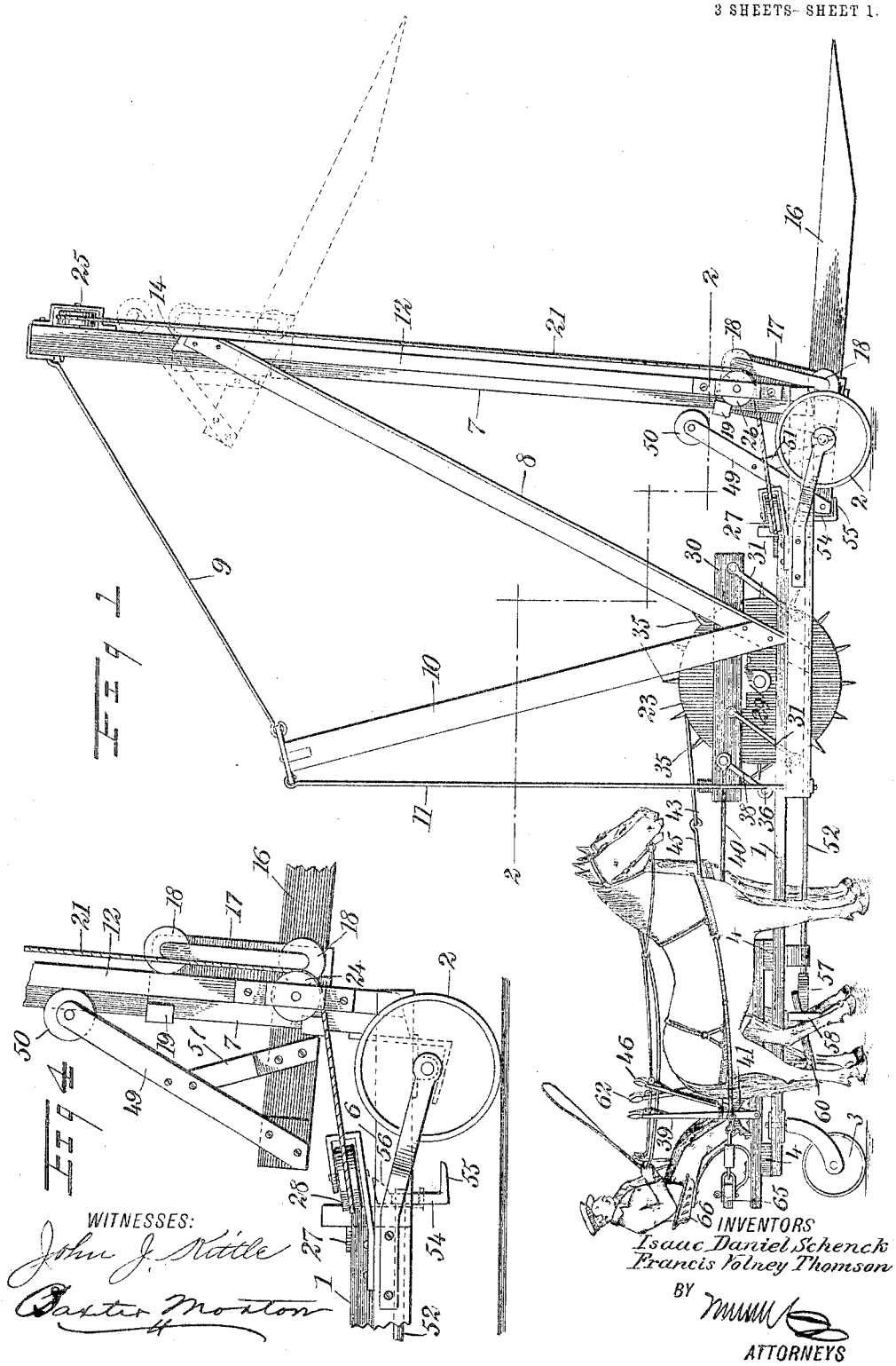

No. 802,241. PATENTED OCT. 17, 1905.
I. D. SCHENCK & F. V. THOMSON.
COMBINED RAKE AND STACKER.
APPLICATION FILED DEC. 30, 1904.
3 SHEETS—SHEET 3.
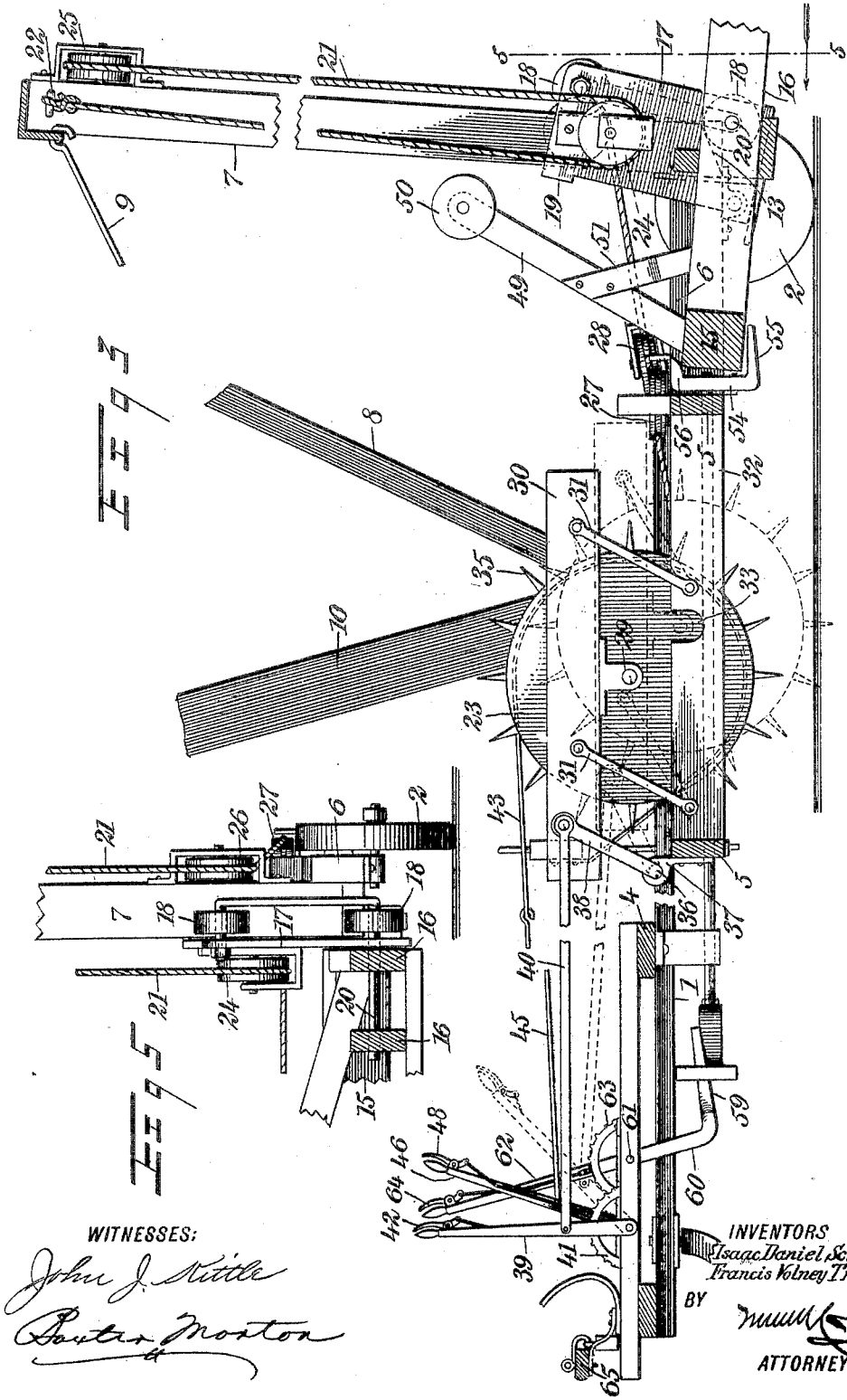
WITNESSES:
INVENTORS
Isaac Daniel Schenck
Francis Volney Thomson
BY
ATTORNEYS

UNITED STATES PATENT OFFICE.

ISAAC DANIEL SCHENCK AND FRANCIS VOLNEY THOMSON, OF BASIN, WYOMING.

COMBINED RAKE AND STACKER.

No. 802,241.   Specification of Letters Patent.   Patented Oct. 17, 1905.

Application filed December 30, 1904. Serial No. 238,922.

*To all whom it may concern:*

Be it known that we, ISAAC DANIEL SCHENCK and FRANCIS VOLNEY THOMSON, citizens of the United States, and residents of Basin, in the county of Bighorn and State of Wyoming, have invented a new and Improved Combined Rake and Stacker, of which the following is a full, clear, and exact description.

This invention relates to apparatus adapted to rake hay of various kinds from the swath, bunch, or windrow, to carry a charge of hay upon the rake-fingers to the stack, and to raise the charge and deposit it upon the stack.

The object of the invention is to provide a comparatively simple apparatus of the character specified which will operate effectively both as a rake and stacker and which will so enable one man driving the rake and stacker to do the work ordinarily performed by two men, one man driving the rake and the other operating the stacker located at the stack.

Further objects of the invention will appear as the same is more fully disclosed, and the novel features of the invention will be clearly pointed out in the appended claims.

Reference is to be had to the accompanying drawings, forming a part of this specification, in which similar characters of reference indicate corresponding parts in all the views.

Figure 1 is a view in elevation of the complete apparatus, the operation of the apparatus in discharging its charge of hay upon a stack being indicated in dotted lines. Fig. 2 is a sectional plan view of the apparatus on line 2 2 of Fig. 1, non-essential parts being broken away to save space. Fig. 3 is a sectional view upon the line 3 3 of Fig. 2. Fig. 4 is a detail view, partly in elevation and partly in section, showing the devices for guiding the rake-head in its upward movement; and Fig. 5 is a detail view, partly in elevation and partly in section, showing the arrangement of the hoisting-cables and guiding devices for the rake-head.

Described in general terms, the apparatus comprises a suitable supporting structure which is preferably mounted upon wheels, so as to be easily transportable, a rake-head, devices for holding the rake-head in proper position to operate as a rake, mechanism for raising the rake-head after it has gathered a charge of hay or the like, and devices for tilting the rake-head after it has been raised to discharge the hay carried thereby.

One specific embodiment of the invention will hereinafter be fully described; but it is to be understood that changes in the form, proportions, and mode of assemblage of the parts may be made within the scope of the appended claims without departing from the spirit of the invention or sacrificing its advantages.

Referring to the drawings by the reference characters marked thereon, 1 1 designate the side members of a horizontal supporting-frame mounted upon front wheels 2 and a swiveled rear wheel 3. The side members 1 1 of the supporting-frame are connected by transverse members 4 4 and 5 5, the latter being extended beyond the side members 1, as shown in Fig. 2, and bearing at their ends forward reaches 6. At the forward ends of the reaches 6 guides 7 are provided, which are suitably connected at the top and are braced by oblique braces 8. The guides 7 are further supported by stays 9, extending obliquely rearward and downward to truss members 10, which are braced by stay-rods 11, extending downward to the frame of the apparatus. Each guide member 7 is provided upon its outer surface with a rib 12, which extends from the bottom of the guide member to a point just above the end of one of the braces 8, where it ends in a beveled face 14. The lower ends of the guide members and ribs are beveled, as shown at 13.

The rake-head is mounted between the guide members 7, and it comprises a back timber 15 and a plurality of fingers 16, connected with the back timber and projecting forward therefrom in the usual manner. The rake-head is supported between two slides arranged for movement upon the guide members 7, and each slide consists, preferably, of a plate 17, provided near its front margin at top and bottom with guide-rollers 18, adapted for contact with the front surface of one of the guide members 7 and provided at its rear margin with lugs 19 for contact with the rear margin and outer face of one of the guide members 7, said lugs 19 being bent over at their outer ends, as best shown in Fig. 2. The rake-head is pivotally connected with the two slides which move along the guide members 7 by means of stubshafts 20, upon which the lower guide-rollers 18 are mounted and which extend through two outer fingers at either side of the rake-head, as clearly shown in Fig. 2.

The slides upon which the rake-head is supported may be raised and lowered by means of hoisting-cables 21, which are both attached at one end to the guide members 7 at their upper ends by means of eyes 22 or the like, as shown in Fig. 3, and which are rove over a plurality of guiding-pulleys and finally attached to a winding-drum 23, which will be hereinafter fully described. From the eyes 22 the cables 21 pass downward around guide-pulleys 24, mounted upon the inner faces of the plates 17, thence upward and over guide-pulleys 25, provided upon the front surfaces of the guide members 7, thence downward again under guide-pulleys 26 near the lower ends of the guide members 7, thence rearward around guide-pulleys 27, turning upon vertical axes inward around guide-pulleys 28, and finally are attached to the winding-drum 23.

The winding-drum is mounted on a shaft journaled in brackets 29, provided beneath the side members 30 of a rectangular supporting-frame carried by pivoted supporting-arms 31, which are attached at their lower ends to longitudinally-disposed members 32, carried by the transverse frame members 5, and provided intermediate of their ends with notches 33 to receive the bearing-brackets 29. The drum 23 is provided at its ends with flanges 34, each of which has a plurality of radially-arranged pointed spikes 35 projecting outwardly therefrom for engagement with the ground when the frame supporting the drum is lowered and rests upon the frame members 32. When the spikes 35 engage with the ground, the forward movement of the apparatus will cause the rotation of the drum and the winding of the hoisting-cables thereon; but when the drum-supporting frame is raised so that the spikes 35 do not engage the ground no rotative movement of the drum is occasioned by the forward movement of the apparatus. In order to raise the drum and hold it out of engagement with the ground when desired, a rock-shaft 36 is journaled in bearings 37 at the rear ends of the frame members 32. Crank-arms 38, carried by the shaft 36, are pivotally connected at their ends with the side members 30 of the drum-supporting frame, and an operating-lever 39, mounted at the rear of the supporting-frame adjacent to the driver's seat, is connected by a link 40 with one of the crank-arms 38. The rear movement of the lever 39 will obviously turn the rock-shaft 36 in its bearings and raise the drum to the extent shown in solid lines in Fig. 3, whereas the forward movement of the lever 39 will allow the drum to descend until the drum engages the ground, as shown by dotted lines in Fig. 3. To hold the lever 39 in any desired position, a segmental rack 41 of ordinary type is provided, and a hand-operated latch 42 is provided on the lever to coöperate with the rack.

When the drum 23 is raised so that the spikes 35 no longer engage the ground, it is necessary to hold the drum to prevent its rotation and the consequent unwinding of the hoisting-cables, if the cables be wound upon the drum, and to this end a brake-band 43 is attached at one end to the drum-supporting frame, carried around the drum in a suitable channel 44, formed in one of the flanges 34, and connected, by means of a link 45, with an operating-lever 46, mounted adjacent to the driver's seat and held in adjusted position by means of a segmental rack 47 and a latch 48, carried by the lever.

In order to hold the rake-head in approximately horizontal position when being hoisted, we provide at either side of the rake-head a forwardly-inclined arm 49, which is preferably secured at one end of the back timber 15, and mount at the free end of the arm 49 a roller 50, which is adapted to contact with one of the ribs 12, provided upon the guide members 7. The arm 49 is preferably braced by an oblique brace member 51, so as to withstand the strain thrown on the arm 49 by the weight of the rake-head and the charge of hay carried upward thereby.

The means employed to hold the forward ends of the rake-fingers 16 in contact with the ground during the action of the rake and for tilting the rake-head to raise the ends of the fingers out of contact with the ground after the completion of the raking operation consists, preferably, of a rock-shaft 52, journaled in the transverse frame members 5 and provided at its forward end with means for engaging the back timber 15 of the rake-head. At its rear end the shaft 52 is connected with operating devices arranged near the driver's seat, by means of which the rock-shaft may be rocked in either direction to raise or lower the forward ends of the rake-fingers. The means provided on the rock-shaft for engaging the back timber 15 consists, preferably, of an arm 53, which is rigidly mounted upon the rock-shaft 52 and has at its free end a peculiar fork 54, comprising a relatively long lower tine 55 and a relatively short upper tine 56, which is beveled on its lower surface to permit the timber 15 of the rake-head to pass easily out of engagement therewith when the rake-head is hoisted. At its rear end the rock-shaft 52 has rigidly mounted thereon an arm 57, which projects inward, and is provided with a head 58 at its inner end, through which the shorter arm 59 of a bell-crank lever 60 extends. The lever 60 is pivoted at 61 upon the supporting-frame of the apparatus, and the longer arm 62 of the lever rises above the frame to a convenient height for operation by the driver of the apparatus. A segmental rack 63, provided adjacent to the bell-crank lever, and the latch 64 serve to hold the lever in adjusted position.

To propel the apparatus when in use, we employ a pair of horses or other draft-animals harnessed at the outside of the longitudinal frame members 1 and behind the rearmost transverse frame member 5. The tractive effort of the horses is exerted upon a doubletree 65, mounted at the rear of the supporting-frame of the apparatus, and a driver's seat 66 is preferably spring-supported above the doubletree, as best shown in Fig. 1.

The operation of the apparatus may be readily understood from the foregoing description and the accompanying drawings. When employed as a rake, the apparatus will have the parts adjusted approximately in the position shown in Fig. 1, the winding-drum 23 being raised so that the spikes 35 do not engage the ground and the forward ends of the rake-fingers being lowered somewhat from the position shown in Fig. 1. To lower the forward ends of the fingers of the rake-head, the bell-crank lever 60 is drawn back and the head 58 of the arm 57 on the rock-shaft 52 is raised, thus imparting to the rock-shaft a partial rotation. At the same time the arm 53 at the forward end of the shaft 52 is raised and the long tine 56 of the fork 54 is pressed upward against the back timber 15 of the rake-head, so depressing the forward ends of the rake-fingers into contact with the ground. When a full charge of hay has been gathered by the rake-head, the bell-crank lever 60 will be forced forward and the back timber 15 of the rake-head will be depressed by the short upper tine 56 of the fork 54, so raising the forward ends of the rake-fingers out of contact with the ground and enabling the apparatus to pass over the ground without gathering any more hay upon the rake-fingers.

When it is desired to raise the rake-head with its charge of hay, the drum-supporting frame must be lowered by means of the lever 39 until the spikes 35 of the drum contact with the ground. At the same time the brake-band 43 must be made slack, so that the engagement of the spikes 35 with the ground as the apparatus moves forward may cause the rotation of the drum and the winding of the hoisting-cables thereon. When the rake-head has been raised almost to the upward limit of its movement, the drum must be lifted out of engagement with the ground and the brake-band 43 applied to prevent the strain on the cables from causing the unwinding of the cables through the free rotation of the drum.

The discharge of the hay from the rake-head is brought about after the apparatus has reached the stack. The discharge is effected by lowering the drum until the spikes 35 are in engagement with the ground, then releasing the brake and causing the apparatus to move forward a very short distance. The forward movement of the apparatus of course causes the drum to turn upon its shaft and wind thereon a sufficient additional length of each hoisting-cable to cause the rake-head to rise until the rollers 50 pass over the upper ends 14 of the guide-ribs 12 and allow the rake-head to tilt into the position indicated in dotted lines in Fig. 1. When the rake-head tilts, as shown in Fig. 1, the charge of hay upon the rake-fingers will slide off and fall upon the stack, where it will be distributed by a man on the top of the stack in the usual manner.

After the discharge of the hay from the rake-head the apparatus is backed away from the stack and the rake is allowed to descend to its normal position preparatory to another raking operation. To permit the descent of the rake-head, the drum is raised out of contact with the ground and the brake-band 43 is relaxed. The weight of the rake-head will then cause it to descend and cause the unwinding of the hoisting-cables from the drum.

From the foregoing description of the construction and operation of the apparatus it will be clearly seen that one man may by its use perform the operations of raking and stacking which have heretofore, so far as we are aware, been performed by two or more men operating separate raking and stacking apparatus, ordinarily requiring the use of at least one more draft-animal than we require for the operation of the combined raking and stacking apparatus above described. It will also be seen that it is unnecessary to unload the hay from the rake at the foot of the stack and then place it on a stacker preparatory to depositing it upon the top of the stack. Hence there is an appreciable saving in time as well as in apparatus, draft-animals, and men for effecting the raking and stacking.

Having thus described our invention, we claim as new and desire to secure by Letters Patent—

1. The combination in apparatus of the character described, of a transportable supporting-frame, guide members extending upward from said frame, slides movable along said guides, a rake-head pivotally mounted on said slides, intermediate of its ends, means carried by the rake-head at one side of the pivot thereof and engaging the guide member, and mechanism for raising and lowering said slides.

2. The combination in an apparatus of the character described, of a supporting-frame, vertical guide members carried by the frame, slides movable on said guide members, a rake-head pivoted to said slides, the pivot of said rake-head being in advance of the rear bar thereof, bars secured to the rear bar of the rake-head and each provided with a roller at its end, said rollers engaging the guide members, and mechanism for raising and lowering the slides.

3. The combination in apparatus of the character described, of a transportable supporting-frame, a rake-head carried thereby, a fixed upwardly-extending guide member adjacent to said rake, a slide upon which said rake-head is pivotally mounted, said slide being movable along said guide member, members for raising and lowering said slide, a supplemental guide, and means carried by said rake-head for engagement with said supplemental guide to hold the rake-head in approximately horizontal position as long as said means is in engagement with said supplemental guide.

4. The combination in apparatus of the character described, of a transportable supporting-frame, a guide-standard mounted on said frame and having a rib thereon terminating short of the top of said guide-standard, a slide mounted on said standard, a rake-head pivotally mounted on said slide, and means carried by said rake-head for engagement with the rib upon said guide-standard to hold the rake-head in approximately horizontal position.

5. The combination in apparatus of the character described, of a transportable supporting-frame, guide-standards carried by said frame, slides movable on said guide-standards, a rake-head pivotally mounted on said slides, ribs shorter than said standards mounted thereon, arms fixed upon said rake-head and engaging said ribs to hold said rake-head in approximately horizontal position, and means for raising and lowering said slides.

6. The combination in apparatus of the character described, of a transportable supporting-frame, upwardly-extending guide-standards carried by said frame, slides movable along said guide-standards, said slides having rollers for engagement with the front surfaces of said guide-standards, a rake-head carried by said slides, and means for raising said slides and lowering said slides until the rollers thereof pass below the ends of said guide-standards.

7. The combination in an apparatus of the character described, of a supporting-frame provided with vertical uprights having ribs terminating short of their upper ends, a rake-head pivotally and slidably mounted on the uprights, arms carried by the rake-head and having at their ends rollers engaging the said ribs, and mechanism for raising and lowering the rake-head.

8. The combination in an apparatus of the character described, of a supporting-frame provided with vertical uprights having ribs terminating short of their upper ends, slides each comprising a plate having guide-rollers for contacting with one face of the uprights and lugs for contacting with the opposing face of the uprights, a rake-head, shafts mounted in the outer fingers of the rake-head and carrying one of the guide-rollers of each of the slides, bars secured to the rear bar of the rake-head and having rollers mounted in their free ends, said rollers engaging the ribs of the uprights, and mechanism for raising and lowering the rake-head.

9. The combination in an apparatus of the character described, of a main frame, a rake-head having vertically-sliding movement on the said frame, a vertically and bodily movable auxiliary frame above the main frame, means for raising and lowering the auxiliary frame, a drum mounted in the said auxiliary frame, and adapted to be rotated by contact with the ground, and cables connected with the rake-head and winding on the drum.

10. The combination in an apparatus of the character described, of a main frame, an auxiliary frame, links pivotally connecting the auxiliary frame with the main frame, a rock-shaft having crank-arms pivoted to the auxiliary frame, means for operating the rock-shaft, a drum mounted in the auxiliary frame and provided with spikes, a rake-head having vertical movement on the main frame, and cables connected with the rake-head and winding on the drum.

11. The combination in an apparatus of the character described, of a main frame, an auxiliary frame, links pivotally connecting the auxiliary frame with the main frame, means for raising and lowering the auxiliary frame, a drum mounted in the auxiliary frame and provided with end flanges having spikes thereon, one of the flanges being provided with a groove, a brake-band in said groove, means for operating the brake-band, a vertically-movable rake-head, and cables connected with the rake-head and winding on the drum.

12. The combination in apparatus of the character described, of a transportable supporting-frame, a rake-head carried by said supporting-frame, means for raising and lowering said rake-head bodily, means for rocking said rake-head when in its lowermost position to raise and lower the forward portion thereof, and means for disengaging said rake-head from said rocking means when the rake-head is raised.

13. The combination in an apparatus of the character described, of a supporting-frame, a rake-head carried by said frame, means for raising and lowering the rake-head, a rocking fork engaging the rear bar of the rake-head, the tines of the fork being of unequal length, and means for rocking said fork.

14. The combination in an apparatus of the character described, of a supporting-frame, a rake-head carried by the frame, means for raising and lowering the rake-head, a rock-shaft provided at one end with an arm having a fork engaging the rear bar of the rake-head, the tines of the fork being of unequal length, the upper one being the shorter and beveled, and means for operating the rock-shaft.

15. The combination in an apparatus of the character described, of a supporting-frame, a rake-head carried by the frame, means for raising and lowering the rake-head, a rock-shaft provided at one end with an arm having a fork engaging the rake-head and at its other end with an arm, and a bell-crank lever having one member engaging the arm of the rock-shaft.

In testimony whereof we have signed our names to this specification in the presence of two subscribing witnesses.

ISAAC DANIEL SCHENCK.
FRANCIS VOLNEY THOMSON.

Witnesses:
JAMES V. GOULD,
WILLIAM B. GOULD.